(12) United States Patent
Henderson et al.

(10) Patent No.: US 11,301,520 B2
(45) Date of Patent: *Apr. 12, 2022

(54) ARTIFICIAL INTELLIGENCE CONTENT DETECTION SYSTEM

(71) Applicant: NewsRx, LLC, Atlanta, GA (US)

(72) Inventors: Charles W Henderson, Atlanta, GA (US); Chantay P. Jones, Marietta, GA (US); Alan D. Henderson, Watkinsville, GA (US); Kalani K. Rosell, New Haven, CT (US)

(73) Assignee: NewsRx, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,329

(22) Filed: Aug. 11, 2016

(65) Prior Publication Data

US 2018/0046712 A1    Feb. 15, 2018

(51) Int. Cl.
*G06F 16/951* (2019.01)
*G06N 5/02* (2006.01)

(52) U.S. Cl.
CPC ........... *G06F 16/951* (2019.01); *G06N 5/022* (2013.01)

(58) Field of Classification Search
CPC .. G06F 17/30864; G06F 16/951; G06N 5/022
See application file for complete search history.

(56) References Cited

U.S. PATENT DOCUMENTS

| | | | |
|---|---|---|---|
| 2005/0080771 A1* | 4/2005 | Fish | G06F 17/30864 |
| 2006/0224662 A1* | 10/2006 | Richardson | G06Q 10/06 709/203 |
| 2007/0198500 A1* | 8/2007 | Lucovsky | G06F 16/951 |
| 2008/0319947 A1* | 12/2008 | Latzina | G06F 17/2785 |
| 2009/0299932 A1* | 12/2009 | Hodge | G06N 5/02 706/45 |
| 2010/0030768 A1* | 2/2010 | Poblete | G06F 16/35 707/748 |
| 2010/0268596 A1* | 10/2010 | Wissner | G06Q 30/00 705/14.49 |
| 2010/0332500 A1* | 12/2010 | Pan | G06F 17/30864 707/759 |
| 2011/0055185 A1* | 3/2011 | Bitan | G06F 16/951 707/706 |
| 2016/0085806 A1* | 3/2016 | Chadha | G06F 17/30864 707/765 |
| 2016/0196348 A1* | 7/2016 | Rodriguez | G06F 17/30864 707/727 |

* cited by examiner

*Primary Examiner* — Alford W Kindred
*Assistant Examiner* — Lin Lin M Htay
(74) *Attorney, Agent, or Firm* — Lee & Hayes, P.C.

(57) ABSTRACT

Technologies are described herein for artificial intelligence content detection system. According to some examples, a pattern detector is used to analyze content generated as a result of a search query acted on by an Internet search engine. The system analyzes content from one or more of the search results against patterns stored in a pattern data store. The patterns, if matched against the content, indicate that the content has a certain likelihood of being generated by an artificial intelligence source. The search results are modified to indicate content generated by an artificial intelligence source.

12 Claims, 7 Drawing Sheets

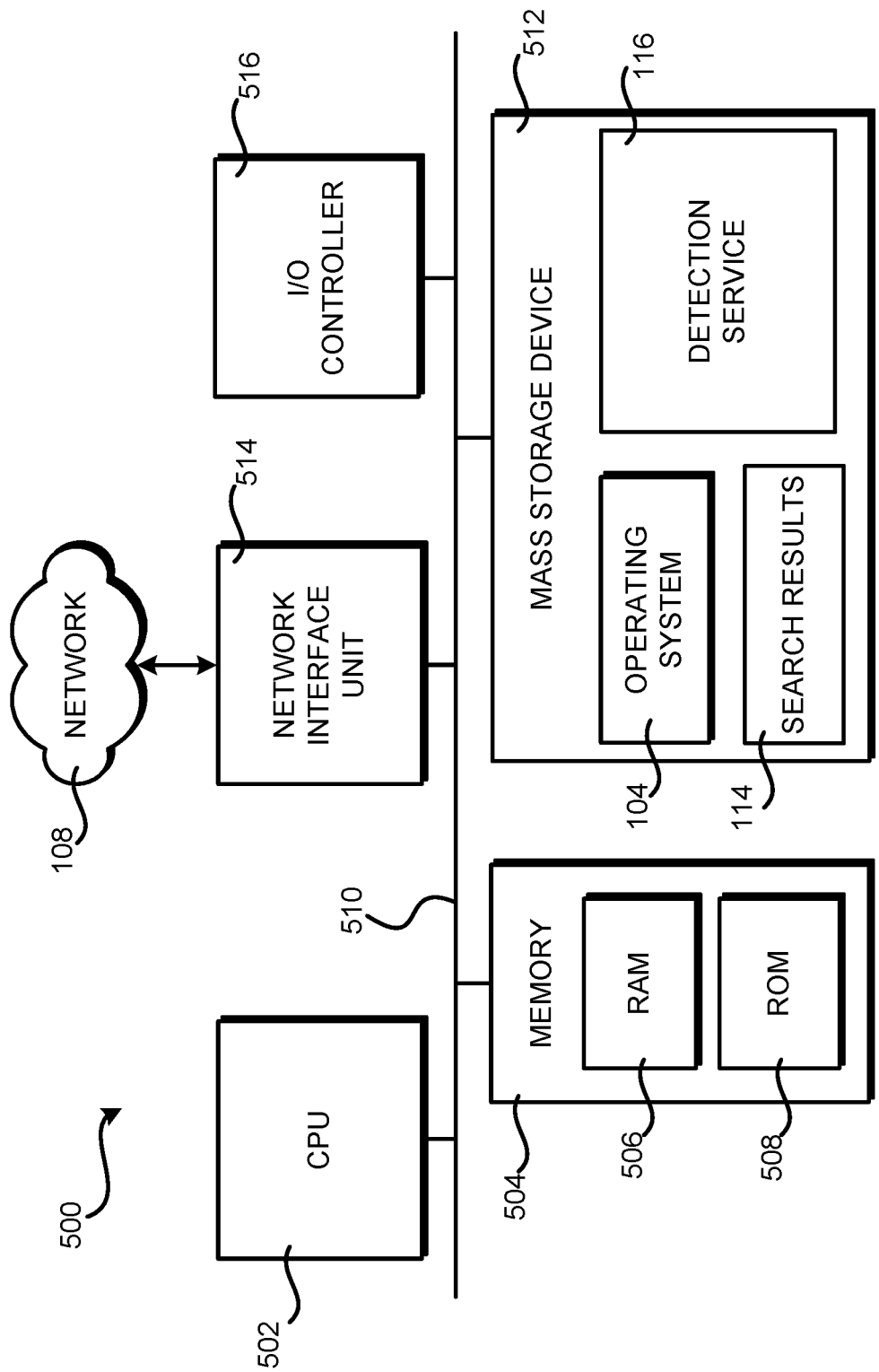

ARTIFICIAL INTELLIGENCE CONTENT DETECTION SYSTEM

BACKGROUND

People and other entities often use Internet search engines to find content on the Internet. Users input one or more terms into a search engine query input. The search engine uses an algorithm to find content in the Internet as search results. It is an objective of search engines to attempt to find accurate and relevant search results in as little time as possible. Users review the information provided by the search engine to select, browse, and review one or more of the search results.

It is with respect to these and other considerations that the disclosure made herein is presented.

SUMMARY

Technologies are described herein for an artificial intelligence content detection system. Generally described, the technologies described herein can receive one or more search results from a search engine. Examples of the detection system analyze content from one or more of the search results. The detection system applies an artificial intelligence detection algorithm to detect whether or not the content is partially or wholly provided by an artificial intelligence source. The detection system then provides a visual output or other output to the user indicating the presence of artificial intelligence content in one or more of the search results. As used herein, "artificial intelligence" content is content constructed, written, or otherwise created by an artificial intelligence source. "Artificial intelligence" is broadly defined to be a computing source configured to operate fully or partially autonomously to generate content.

In some examples, the detection system can be used to limit or exclude the inclusion of artificial intelligence content in search results. In some examples, the detection system can be configured to remove search results comprised of a designated portion of artificial intelligence content. In some examples, the detection system can receive an input from a user (or other entity) to only allow a certain percentage of the search results to contain artificial intelligence content.

It should be appreciated that the above-described subject matter can be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a computer architecture diagram illustrating an illustrative computer hardware and software architecture for a computing system capable of implementing the technologies presented herein.

DETAILED DESCRIPTION

Figure 1:
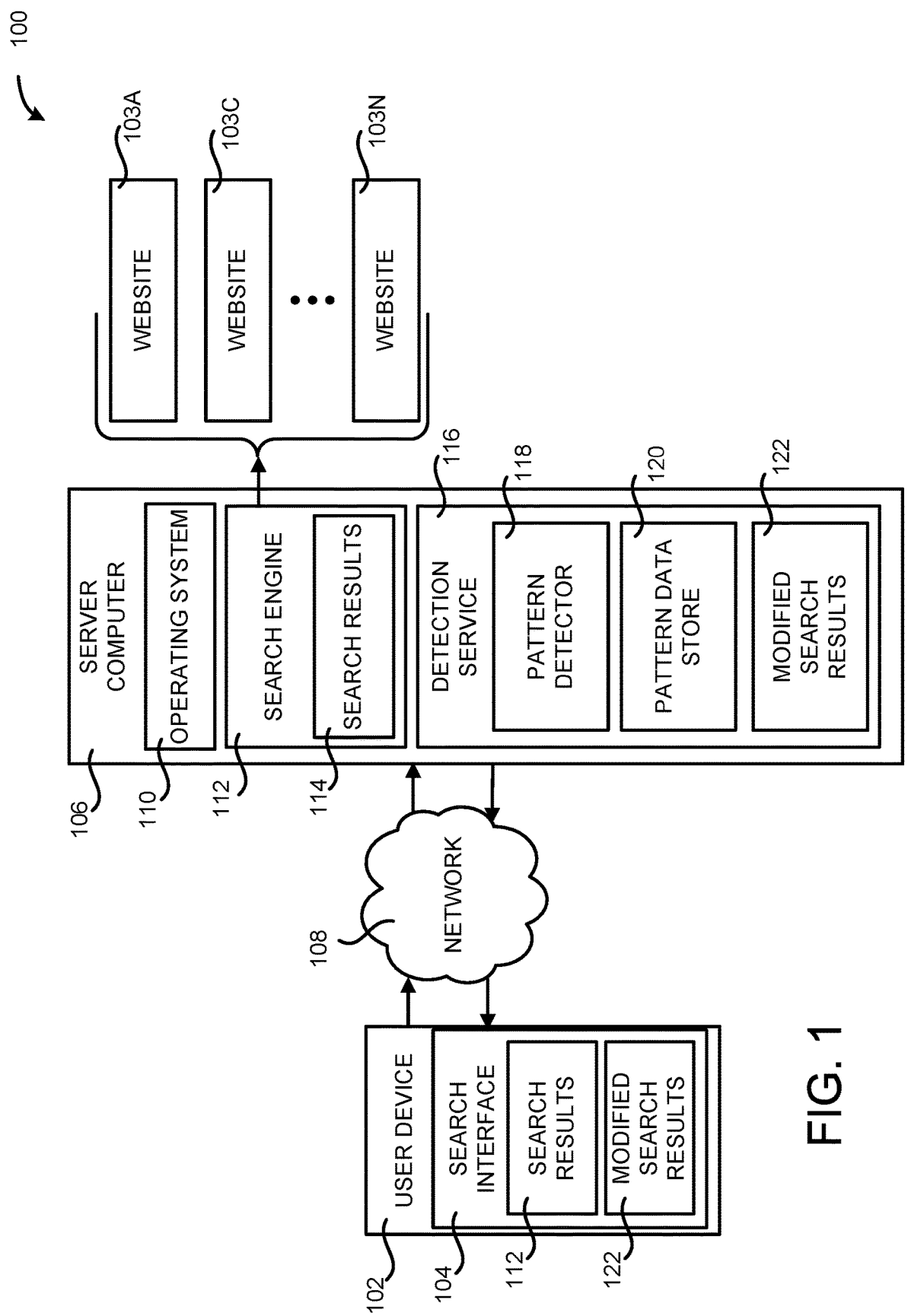
FIG. 1 is a system diagram illustrating an artificial intelligence content detection system.

The following detailed description is directed to technologies for an artificial intelligence content detection system. When using services provided by a search engine, the artificial intelligence detection system can receive the search results provided by the search engine. The detection system can analyze content within a portion of the search results to determine if the content was generated by an artificial intelligence system. The detection system can provide visual, or other, indicators to the user signifying the presence of the artificial intelligence content.

When accessing content on the Internet, the user may be provided with numerous search results relating to the query entered into the search engine. Increasingly, artificial intelligence sources are being used to generate content that is searchable. When previously accessing content, the user may be able to determine bias, goodwill, knowledge, or other "intangible information" relating to the content because the content can be identifiable as either coming from an identifiable website or, in a decreasing amount, as being written by a known writer.

However, as mentioned above, in an effort to decrease costs and increase content, publisher of content (e.g. websites) increasingly turn to content generated by artificial intelligence sources. While serving a beneficial role in multiple circumstances, because the source of the artificial intelligence content is often unknown, and more often the knowledge that content was in fact generated by an artificial intelligence source, users of content often do not have enough information to make an educated judgment about the value, truthfulness, completeness, or bias of the content.

To handle these and other issues, in accordance with the technologies disclosed herein, technologies for an artificial intelligence content detection system are provided. In some examples, an implementation of the technologies described herein can decrease the time and/or effort of a user to determine the usefulness of content on the Internet to the user. In other examples, content having a particular percentage of artificial intelligence content can be excluded from search results, thus reducing computing resources.

In some examples, the sheer number of potential sources of content generated by an artificial intelligence source may make analysis by a human impossible or ineffective. A human would need to be educated as to one or more patterns, and then review the content manually, a task that may render the convenience of the Internet useless. In other examples, removing unwanted content, e.g. content from an artificial intelligence source, can reduce the computing resources for a user using an Internet search engine, as a reduced number of websites are returned in the results and fewer websites are accessed. These and other benefits and advances can be realized using various technologies disclosed herein.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific examples. Referring now to the drawings, aspects of technologies for an artificial intelligence detection system will be presented.

Referring now to FIG. 1, aspects of a detection system 100 for detecting artificial intelligence content in Internet search results are described. The detection system 100 shown in FIG. 1 includes a user device 102. According to various configurations, the functionality of the user device 102 can be provided by a personal computer ("PC") such as a desktop, tablet, or laptop computer system. In some other configurations, the functionality of the user device 102 can be provided by other types of computing systems including, but not limited to, a handheld computer, a netbook computer, an embedded computer system, a mobile telephone, a smart phone, or another computing device.

Various aspects of the user device 102 are illustrated and described below. Although the functionality of the user device 102 is primarily described herein as being provided by a tablet or slate computing device, a smartphone, or a PC having a touch-sensitive display, because the functionality described herein with respect to the user device 102 can be provided by additional and/or alternative devices, it should be understood that these examples are illustrative, and should not be construed as being limiting in any way.

The user device 102 is configured to provide functionality for a search interface 104. The search interface 104 can be used by a user to enter terms to search for content provided one or more websites 103A-103N (hereinafter referred to collectively and/or generically as "the websites 103" and individually as "the website 103A," "the website 103B," and the like). In some examples, the search interface 104 is an Internet web browser.

The user device 102 is in communication with a server computer 106 through network 108. The server computer 106 is configured to provide functionality for detecting artificial intelligence content in Internet search results. It should be understood, however, that various aspects of the presently disclosed subject matter can be performed wholly or partially on other devices, such as the user device 102 or another server computer (not shown). The server computer 106 can be configured to execute an operating system 110 and a search engine 112. The operating system 110 is a computer program for controlling the operation of the server computer 106.

The search engine 112 is an executable program configured to execute on top of the operating system 110 to provide various functions. In some examples, the server computer 106 executes the search engine 112. In some examples, the search engine 112 is an application configured to access one or more of the websites 103 or an index (not shown) of the one or more websites 103. In some examples, the search engine 112 is an enterprise application that is executed as an on-premises software or software as a service ("SAAS"), among other examples. In some examples, the search engine 112 is provided by another server computer. These and other examples are considered to be within the scope of the presently disclosed subject matter.

In some examples, the search engine 112 receives a search query from the search interface 104. The search query can be one or more terms, images, video, or other input. The search engine 112 receives the query and, using various algorithms, searches for content in the websites 103 that are relevant to the query based on the algorithm used by the search engine 112. The presently disclosed subject matter is not limited to any particular algorithm used, as conventional search algorithms may be used.

The result of the search by the search engine 112 are stored as search results 114. In some examples, the search engine 112 returns the search results 114 to the search interface 104 of the user device 102. In some examples, the user or other entity that input the search query may want to know if one or more of the search results include content that was generated using artificial intelligence sources. In these examples, a detection service 116 may be invoked.

The detection service 116 is an application configured to receive the search results 114 from the search engine 112. The detection service 116 accesses one of more of the websites 103 identified in the search results 114. For example, the website 103A may be one of the search results 114. The detection service 116 can access and analyze the website 103A. To determine if the website 103A includes content generated by an artificial intelligence source, the detection service 116 invokes a pattern detector 118.

The pattern detector 118 is a service configured to analyze text to determine a probability or likelihood that the content was generated by an artificial intelligence source. As used herein, a "pattern" is a sequence of words, particular words, one or more images, or other content that indicates a certain probability that the content was generated by an artificial intelligence source.

In some examples, even with an increasing ability to create content that mimics the randomness, uniqueness, and peculiarity of content generated by a human, given enough of a sample size, or if the content has certain markers, one or more patterns can be identified. For example, the detection service 116 may have determined that content that strictly follows the subject-verb throughout the content is a pattern indicative of content generated by an artificial intelligence source.

Patterns identified by the pattern detector 118 are stored in the pattern data store 120. In some examples, the pattern detector 118 can be configured to continuously or autonomously access content on the Internet to determine additional patterns. In further examples, the pattern detector 118 can be configured to present a user or other entity with content that is potentially generated by an artificial intelligence source. A user or other entity can analyze the content and provide an input identifying the content as being produced by an artificial intelligence source. These and other examples of identifying patterns are considered to be within the scope of the presently disclosed subject matter. It should be noted that a pattern may also be a mathematical formula.

Continuing with the example started above, to determine if the website 103A includes content generated by an artificial intelligence source, the pattern detector 118 applies the one or more patterns stored in the pattern data store 120 to the content in the website 103A. If content within the website 103A matches a pattern stored in the pattern data store 120, the detection service 116 provides an output that indicates that the website 103A includes content generated by an artificial intelligence source. In some examples, if the user accesses the website, the detection service 116 may act in concert with the search interface to signify or mark the content identified as artificial intelligence content.

The detection service 116 can continue analyzing one or more of the remaining websites 103 of the search results 114 to determine if other websites 103 include content generated by an artificial intelligence source. The detection service 116 can receive the analysis and generate modified search results 122. The server computer 106 can provide the modified search results 122 to the user device 102.

The search results 114 can be modified in various ways to be the modified search results 122. For example, if the search results 114 are a listing of the websites 103, the websites 103 that include content generated by an artificial intelligence source can be identified in a different color or other manner to visually distinguish them when displayed from the websites 103 that do not include content generated by an artificial intelligence source.

In other examples, the search results 114 can be modified to be the modified search results 122 by remove all or a portion of the search results 114 that include content generated by an artificial intelligence source. In those examples, the websites 103 that include content generated by an artificial intelligence source are removed from the search results 114, resulting in the modified search results 122. In some examples, only a portion or percentage of the search results 114 are excluded.

In some examples, the modified search 122 are the results returned initially to the user. In these examples, the search engine 112 may be configured to use the patterns as filters to exclude results that include content generated from an artificial intelligence source from the search results 114.

Figure 2A:
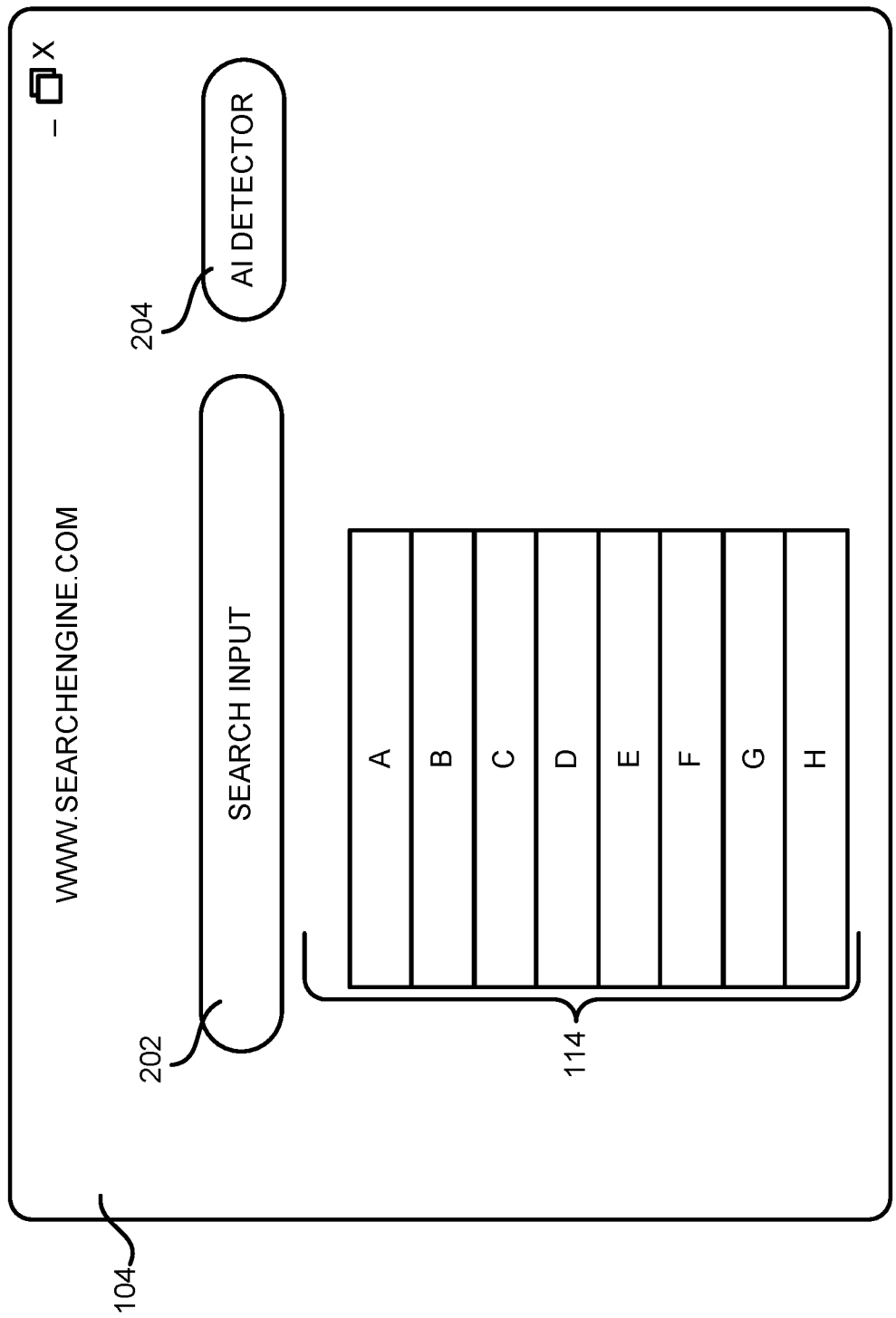
FIGS. 2A-2C are screen diagrams showing an illustrative graphical user interface that is configured with graphical elements for providing an artificial intelligence content detection system.
Figure 2B:
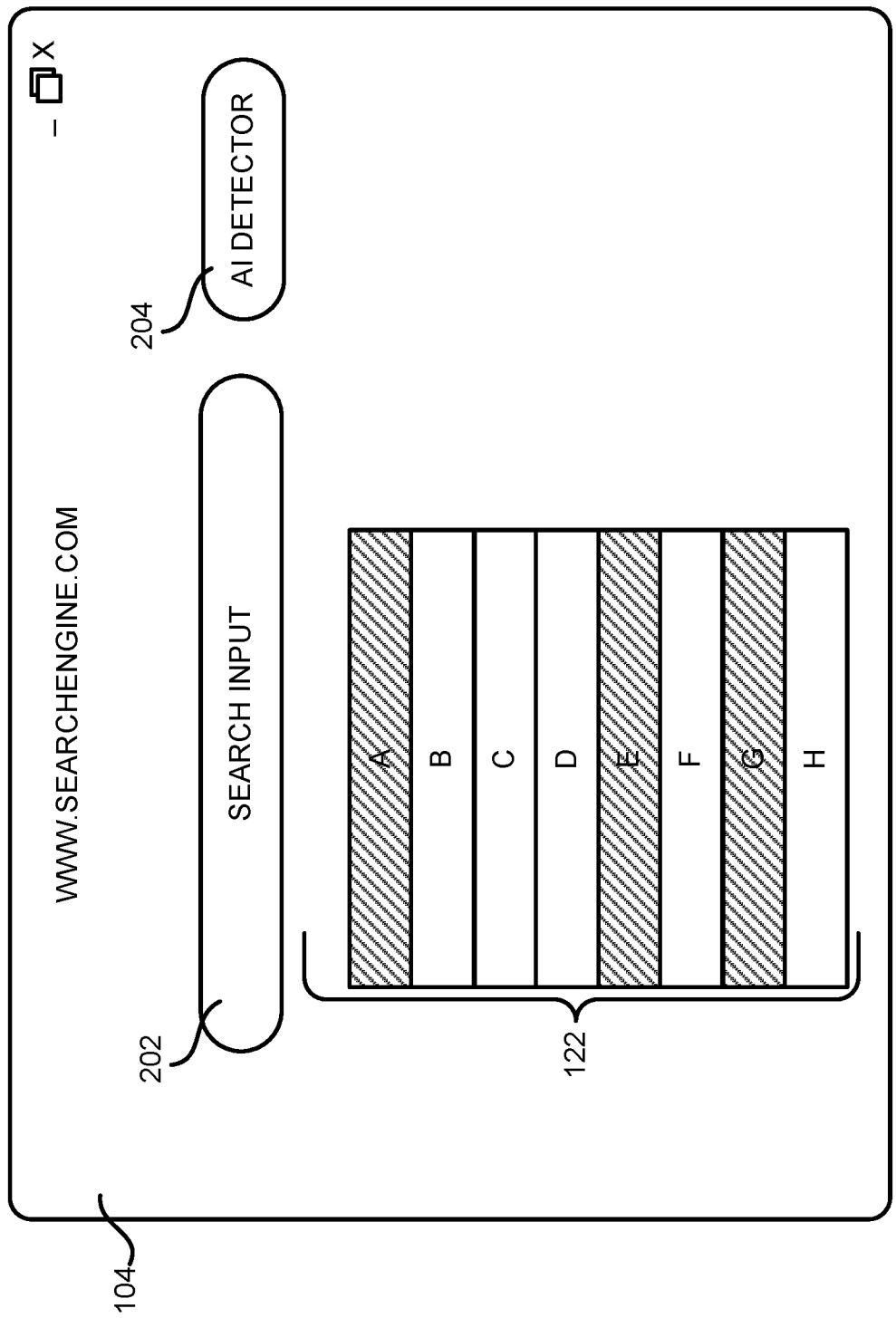
Figure 2C:
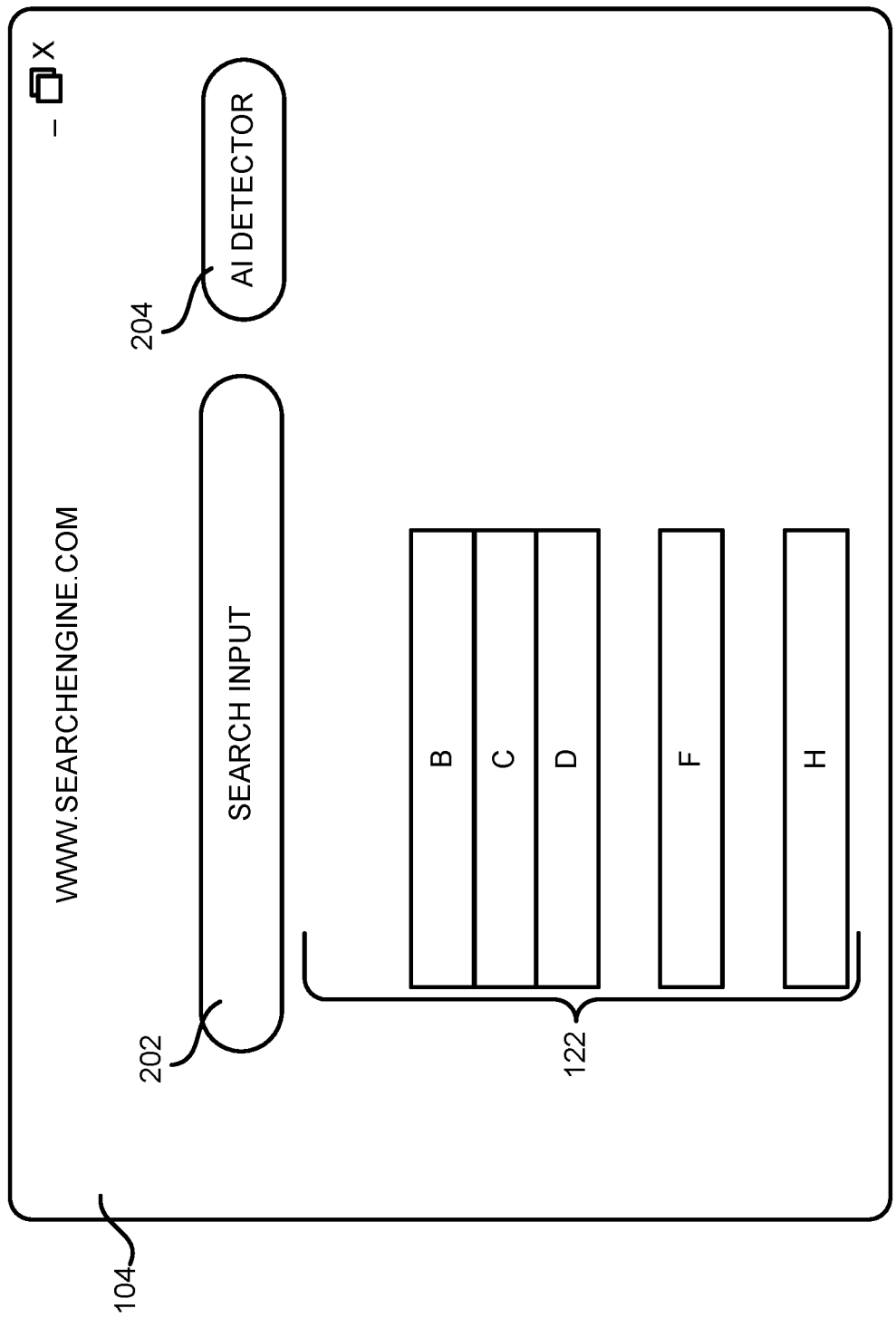

FIGS. 2A-2C are screen diagrams showing the detection system 100 in use. In FIG. 2A, the search interface 104 uses an Internet browser to access the search engine 112. The search interface 104 includes a search input 202. The search input 202 is configured to receive one or more search terms, images, and the like. The information entered into the search input 202 is transmitted to the search engine 112 to search for content relating to the information entered into the search input 202. The search results 114 are provided. It should be noted that in some examples, when using the detection service 116, the search results 114 may not be shown or provided before the modified search results 122 are generated.

FIG. 2A also includes an AI detector input 204. When an input is received at the AI detector input 204, the detection service 116 is invoked. In some examples, the detection service 116 is invoked automatically without user input. For example, the detection service 116 can be an application executing with the Internet browser that is invoked when the Internet browser is used to access a search engine 112.

FIG. 2B is a search results interface 204 showing the modified search results 122. In FIG. 2B, the modified search results 122 are presented after the detection service 116 analyzed the content found in the search results 114. In FIG. 2B, websites A, E, and G of the modified search results are indicated as comprising content generated from an artificial intelligence source. FIG. 2C is an alternate search results interface 204 showing the modified search results with the websites A, E, and G removed from the modified search results 122.

Figure 3:
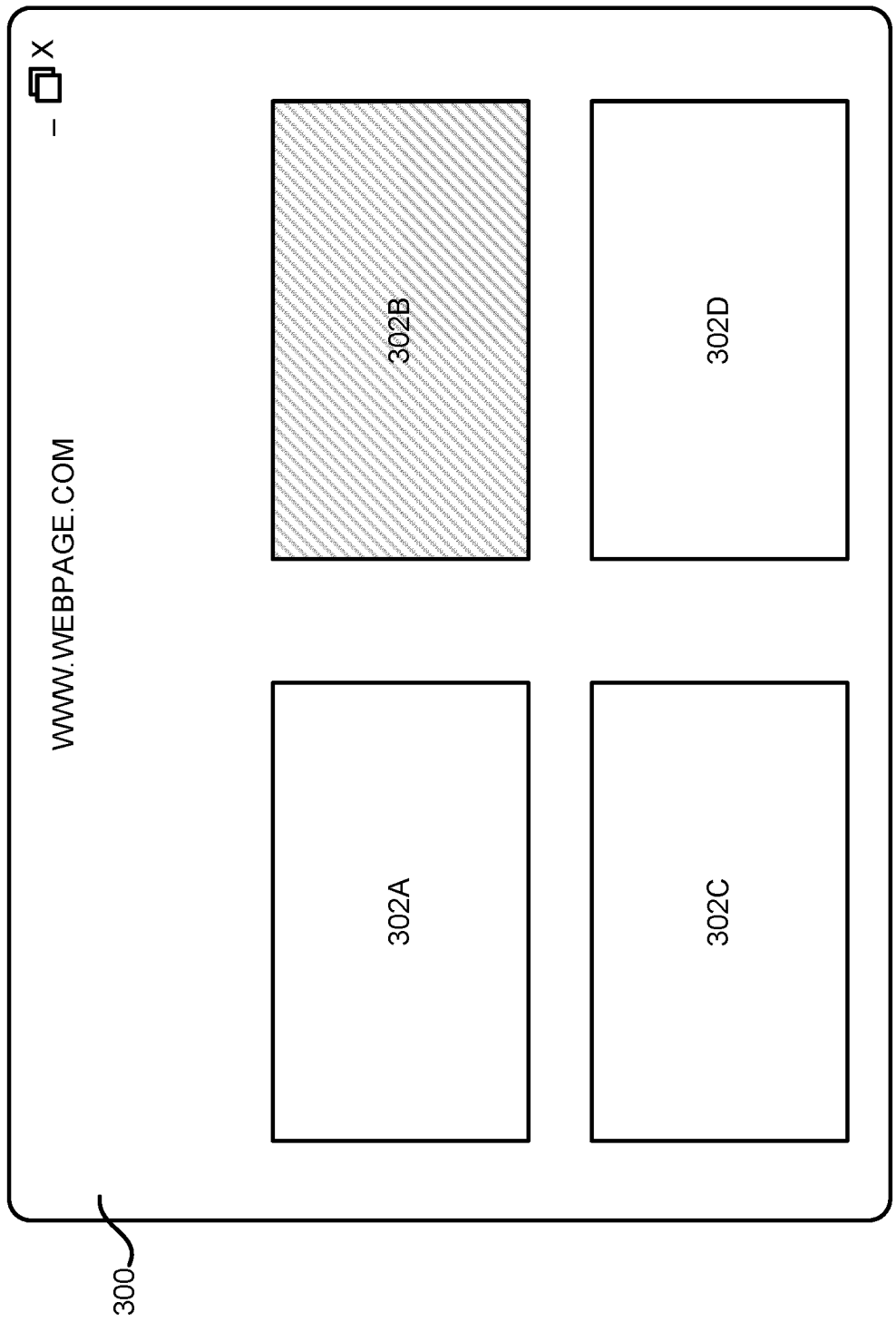
FIG. 3 is a screen diagram showing an illustrative graphical user interface displaying search results modified to indicate the presence of content generated by an artificial intelligence source in the search results.

FIG. 3 is an illustrative web page 300 the use of the detection service 116 to indicate content generated from on artificial intelligence source when accessing a website. In FIG. 3, the web page 300 includes content 302A, 302B, 302C, and 302D. The detection service 116 has analyzed the content 302A, 302B, 302C, and 302D and determined that content 302B is content generated by an artificial intelligence source. To indicate that content 302B has been determined to be created by an artificial intelligence source, the visual appearance of the content 302B has been modified to be different from the content 302A, 302C, and 302D.

Figure 4:
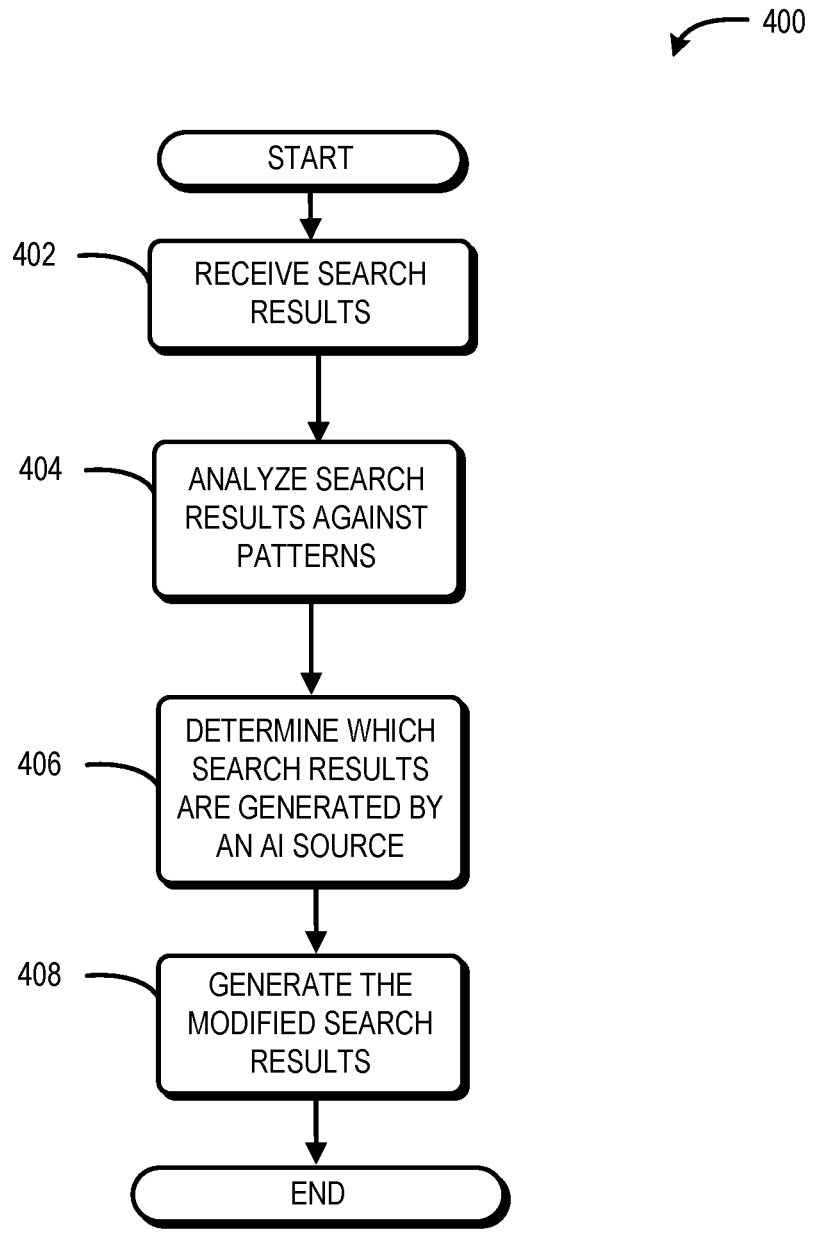
FIG. 4 is a flow diagram showing a routine illustrating aspects of a mechanism disclosed herein for providing an artificial intelligence content detection system.

FIG. 4 is a flow diagram showing aspects of a method 400 disclosed herein for providing an artificial intelligence content detection system. It should be understood that the operations of the method 400 are not necessarily presented in any particular order and that performance of some or all of the operations in an alternative order(s) is possible and is contemplated. The operations have been presented in the demonstrated order for ease of description and illustration. Operations can be added, omitted, and/or performed simultaneously, without departing from the scope of the appended claims.

It also should be understood that the illustrated method 400 can be ended at any time and need not be performed in its entirety. Some or all operations of the method 400, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Computer-storage media does not include transitory media.

Thus, it should be appreciated that the logical operations described herein can be implemented as a sequence of computer implemented acts or program modules running on a computing system, and/or as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules can be implemented in software, in firmware, in special purpose digital logic, and any combination thereof.

For purposes of illustrating and describing the technologies of the present disclosure, the method 400 disclosed herein is described as being performed by the server computer 106 via execution of computer executable instructions such as, for example, the search engine 112. As explained above, the search engine 112 can include functionality for providing an artificial intelligence content detection system. While the method 400 is described as being provided by the server computer 106, it should be understood that the server computer 106 and/or the user device 102 can provide the functionality described herein via execution of various application program modules and/or elements. Additionally, devices other than, or in addition to, the server computer 106 can be configured to provide the functionality described herein via execution of computer executable instructions other than, or in addition to, the search engine 112. As such, it should be understood that the described configuration is illustrative, and should not be construed as being limiting in any way.

The method 400 begins at operation 402, where the search results 114 are received. The search results 114 can be provided by various types of content search providers, including the search engine 112. In some examples, the search results 114 are websites, images, text, and the like, relevant to the search input as determined by the search engine 112.

The method 400 continues to operation 404, where the search results 114 are analyzed against patterns stored in the pattern data store 120. The pattern detector 118 attempts to match known patterns to the content in the search results 114 to determine if the content is provided by an artificial intelligence source. In some examples, the pattern detector 118 is used before the search results 114 are generated. The pattern detector 118 can be applied to all or a designated or predetermined number of the search results 114.

In some examples the patterns are created by analyzing content known to be created by an artificial intelligence source. In other examples, the patterns may be created by determining one or more features, sentence structures, pattern of words, or other patterns that indicate that an artificial intelligence source is used to create content. The presently disclosed subject matter is not limited to any particular technology for determining patterns.

The method 400 continues to operation 406, where the search results that are generated by an artificial intelligence source are identified.

The method 400 continues to operation 408, where the modified search results are generated. In some examples, all artificial intelligence content is excluded from the modified search results. In other examples, the user can specify a percentage of websites returned that include content from artificial intelligence sources. For example, a user may specify that the modified search results are to include 50% of the results identified as having content generated by an artificial intelligence source. The method 400 can thereafter end.

The present disclosure also encompasses the subject matter set forth in the following clauses:

Clause 1: A computer-implemented method, the method comprising: receiving a plurality of search results generated from the receipt of a search query at a search engine; analyzing at least a portion of content in the search results against a plurality of patterns to determine if the at least the portion of content was generated by an artificial intelligence source; and modifying the search results to generate modified search results based on the analysis.

Clause 2. The computer-implemented method of clause 1, wherein the search results are modified by removing at least a portion of the search results identified as generated by an artificial intelligence source.

Clause 3. The computer-implemented method of any of clauses 1-2, wherein the search results are modified by visually distinguishing the search results identified as generated by an artificial intelligence source from the search results that do not include content generated by an artificial intelligence source.

Clause 4. The computer-implemented method of any of clauses 1-3, wherein a least a portion of the plurality of patterns are created by analyzing content known to be created by an artificial intelligence source.

Clause 5. The computer-implemented method of any of clauses 1-4, wherein a least a portion of the plurality of patterns are created by determining one or more features, sentence structures, images, or words that indicate that an artificial intelligence source is used.

Clause 6. The computer-implement method of any of clauses 1-5, wherein the search query comprises one or more words.

Clause 7. The computer-implement method of any of clauses 1-6, wherein the search query comprises an image or video.

Clause 8. A computer-readable storage medium having computer-executable instructions stored thereupon that, when executed by a computer, cause the computer to: receive a plurality of search results generated from the receipt of a search query at a search engine; analyze at least a portion of content in the search results against a plurality of patterns to determine if the at least the portion of content was generated by an artificial intelligence source; and modify the search results to generate modified search results based on the analysis.

Clause 9. The computer-readable storage medium of clause 8, wherein the search results are modified by removing at least a portion of the search results identified as generated by an artificial intelligence source.

Clause 10. The computer-readable storage medium of any of clauses 8-9, wherein the search results are modified by visually distinguishing the search results identified as generated by an artificial intelligence source from the search results that do not include content generated by an artificial intelligence source.

Clause 11. The computer-readable storage medium of any of clauses 8-10, wherein a least a portion of the plurality of patterns are created by analyzing content known to be created by an artificial intelligence source.

Clause 12. The computer-readable storage medium of any of clauses 8-11, wherein a least a portion of the plurality of patterns are created by determining one or more features, sentence structures, images, or words that indicate that an artificial intelligence source is used.

Clause 13. The computer-readable storage medium of any of clauses 8-12, wherein the search query comprises one or more words.

Clause 14. The computer-readable storage medium of any of clauses 8-13, wherein the search query comprises an image or video.

Clause 15. A system comprising: a processor; and a computer-readable storage medium in communication with the processor, the computer-readable storage medium having computer-executable instructions stored thereupon which, when executed by the processor, cause the processor to receive a plurality of search results generated from the receipt of a search query at a search engine; analyze at least a portion of content in the search results against a plurality of patterns to determine if the at least the portion of content was generated by an artificial intelligence source; and modify the search results to generate modified search results based on the analysis.

Clause 16. The system of clause 15, wherein the search results are modified by removing at least a portion of the search results identified as generated by an artificial intelligence source.

Clause 17. The system of any of clauses 15-16, wherein the search results are modified by visually distinguishing the search results identified as generated by an artificial intelligence source from the search results that do not include content generated by an artificial intelligence source.

Clause 18. The system of any of clauses 15-17, wherein a least a portion of the plurality of patterns are created by analyzing content known to be created by an artificial intelligence source.

Clause 19. The system of any of clauses 15-18, wherein a least a portion of the plurality of patterns are created by determining one or more features, sentence structures, images, or words that indicate that an artificial intelligence source is used.

Clause 20. The system of any of clauses 15-19, wherein the search query comprises one or more words, an image, or video.

FIG. 5 illustrates an illustrative computer architecture 500 for an artificial intelligence content detection system described herein for intelligent calendar event linking. Thus, the computer architecture 500 illustrated in FIG. 5 illustrates an architecture for a server computer, mobile phone, a smart phone, a desktop computer, a netbook computer, a tablet computer, and/or a laptop computer. The computer architecture 500 can be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 104 and one or more application programs or data stores including, but not limited to, the search results 114, and the detection service 116.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media can include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, a "computer storage medium" or "computer-readable storage medium," and variations thereof, do not include waves, signals, and/or other transitory and/or intangible communication media, per se. For the purposes of the claims, "computer-readable storage medium," and variations thereof, refers to one or more types of articles of manufacture.

According to various configurations, the computer architecture 500 can operate in a networked environment using logical connections to remote computers through a network such as the network 108. The computer architecture 500 can connect to the network 108 through a network interface unit 514 connected to the bus 510. It should be appreciated that the network interface unit 514 can also be utilized to connect to other types of networks and remote computer systems. The computer architecture 500 can also include an input/output controller 516 for receiving and processing input from a number of other devices, including a keyboard, mouse, or electronic stylus (not shown in FIG. 5). Similarly, the input/output controller 516 can provide output to a display screen, a printer, or other type of output device (also not shown in FIG. 5).

It should be appreciated that the software components described herein can, when loaded into the CPU 502 and executed, transform the CPU 502 and the overall computer architecture 500 from a general-purpose computing system into a special-purpose computing system customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 can include other types of computing devices, including hand-held computers, embedded computer systems, personal digital assistants, and other types of computing devices known to those skilled in the art. It is also contemplated that the computer architecture 500 might not include all of the components shown in FIG. 5, can include other components that are not explicitly shown in FIG. 5, or might utilize an architecture completely different than that shown in FIG. 5.

Based on the foregoing, it should be appreciated that technologies for intelligent calendar event linking have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations and applications illustrated and described, and without departing from the true spirit and scope of the present invention, aspects of which are set forth in the following claims.

What is claimed is:

1. A computer-implemented method for identifying artificial intelligence content, the method comprising:
   receiving a plurality of search results generated from the receipt of a search query at a search engine;
   extracting at least a portion of content from at least one of the plurality of search results;
   determining a pattern in the at least a portion of content extracted from the at least one of the plurality of search results;
   determining a match between the pattern in the at least a portion of content extracted from the at least one of the plurality of search results and a plurality of stored patterns determined to be associated with an artificial intelligence source;
   modifying the search results to generate modified search results to indicate at least the portion of content generated by one of the one or more artificial intelligence sources, wherein the modification is based on the analysis and the determination of the match between the pattern in the at least a portion of context extracted from the at least one of the plurality of search results and the plurality of stored patterns determined to be associated with the artificial intelligence source, wherein a least a portion of the plurality of stored patterns are created by determining one or more features, sentence structures, images, or words that indicate that an artificial intelligence source is used; and
   removing the at least the portion of content extracted from the at least one of the plurality of search results, the portion of content generated by one of the one or more artificial intelligence sources and maintaining search results not comprising content generated by the one or more artificial intelligence sources.

2. The computer-implemented method of claim 1, wherein a least a portion of the plurality of patterns are created by analyzing content known to be created by an artificial intelligence source.

3. The computer-implement method of claim 1, wherein the search query comprises one or more words.

4. The computer-implement method of claim 1, wherein the search query comprises an image or video.

5. Currently Amended) A computer-readable storage medium having computer-executable instructions stored thereupon that, when executed by a computer, cause the computer to:
   receive a plurality of search results generated from the receipt of a search query at a search engine;
   extract at least a portion of content from at least one of the plurality of search results;
   determine a pattern in the at least a portion of content extracted from the at least one of the plurality of search results;
   determine a match between the pattern in the at least a portion of content extracted from the at least one of the plurality of search results and a plurality of stored patterns determined to be associated with an artificial intelligence source;
   modify the search results to generate modified search results to indicate at least the portion of content generated by one of the one or more artificial intelligence sources, wherein the modification is based on the analysis and the determination of the match between the pattern in the at least a portion of context extracted from the at least one of the plurality of search results and the plurality of stored patterns determined to be associated with the artificial intelligence source, wherein a least a portion of the plurality of stored patterns are created by determining one or more features, sentence structures, images, or words that indicate that an artificial intelligence source is used; and
   remove the at least the portion of content extracted from the at least one of the plurality of search results, the portion of content generated by one of the one or more artificial intelligence sources and maintain search results not comprising content generated by the one or more artificial intelligence sources.

6. The computer-readable storage medium of claim 5, wherein a least a portion of the plurality of patterns are created by analyzing content known to be created by an artificial intelligence source.

7. The computer-readable storage medium of claim 5, wherein a least a portion of the plurality of patterns are created by determining one or more features, sentence structures, images, or words that indicate that an artificial intelligence source is used.

8. The computer-readable storage medium of claim 5, wherein the search query comprises one or more words.

9. The computer-readable storage medium of claim 5, wherein the search query comprises an image or video.

10. A system for identifying artificial intelligence content, the system comprising:
    a processor; and
    a computer-readable storage medium in communication with the processor, the computer-readable storage medium having computer-executable instructions stored thereupon which, when executed by the processor, cause the processor to receive a plurality of search results generated from the receipt of a search query at a search engine;

extract at least a portion of content from at least one of the plurality of search results;

determine a pattern in the at least a portion of content extracted from the at least one of the plurality of search results;

determine a match between the pattern in the at least a portion of content extracted from the at least one of the plurality of search results and a plurality of stored patterns determined to be associated with an artificial intelligence source;

modify the search results to generate modified search results to indicate at least the portion of content generated by one of the one or more artificial intelligence sources, wherein the modification is based on the analysis and the determination of the match between the pattern in the at least a portion of context extracted from the at least one of the plurality of search results and the plurality of stored patterns determined to be associated with the artificial intelligence source, wherein a least a portion of the plurality of patterns are created by determining one or more features, sentence structures, images, or words that indicate that an artificial intelligence source is used; and remove the at least the portion of content extracted from the at least one of the plurality of search results, the portion of content generated by one of the one or more artificial intelligence sources and maintain search results not comprising content generated by the one or more artificial intelligence sources.

11. The system of claim 10, wherein a least a portion of the plurality of patterns are created by analyzing content known to be created by an artificial intelligence source.

12. The system of claim 10, wherein the search query comprises one or more words, an image, or video.

* * * * *